(12) United States Patent
Zhang

(10) Patent No.: US 10,594,857 B2
(45) Date of Patent: Mar. 17, 2020

(54) ELECTRONIC APPARATUS AND CONTROLLING METHOD THEREOF

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventor: Kai Zhang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

(*) Notice: Subject to any disclaimer, the term of this patent is extended or adjusted under 35 U.S.C. 154(b) by 0 days.

(21) Appl. No.: 15/749,658

(22) PCT Filed: Jun. 30, 2017

(86) PCT No.: PCT/CN2017/091191
§ 371 (c)(1),
(2) Date: Feb. 1, 2018

(87) PCT Pub. No.: WO2018/090640
PCT Pub. Date: May 24, 2018

(65) Prior Publication Data
US 2019/0020755 A1 Jan. 17, 2019

(30) Foreign Application Priority Data
Nov. 18, 2016 (CN) .......................... 2016 1 1028802

(51) Int. Cl.
G06F 3/0346 (2013.01)
H04M 1/73 (2006.01)
(Continued)

(52) U.S. Cl.
CPC ............ H04M 1/73 (2013.01); G06F 1/1626 (2013.01); G06F 3/0346 (2013.01);
(Continued)

(58) Field of Classification Search
CPC ........ G06F 3/0481; G06F 1/1626; G06F 1/26; G06F 3/04817; G06F 3/0488
(Continued)

(56) References Cited

U.S. PATENT DOCUMENTS

2004/0192412 A1 9/2004 Ono et al.
2007/0103434 A1 5/2007 Lian et al.
(Continued)

FOREIGN PATENT DOCUMENTS

CN 1964366 A 5/2007
CN 102075612 A 5/2011
(Continued)

OTHER PUBLICATIONS

International Search Report and Written Opinion dated Sep. 6, 2017; PCT/CN2017/091191.

Primary Examiner — Abdul-Samad A Adediran
(74) Attorney, Agent, or Firm — Ladas & Parry LLP

(57) ABSTRACT

An electronic apparatus includes: a primary display screen and a secondary display screen located in different areas of the electronic apparatus respectively; the primary display screen is configured to display in a first display mode; the secondary display screen is configured to display in a second display mode; the first display mode is that after the electronic apparatus is turned on, in a non-standby state, the display screen is in the display enabled state, and in a standby state, or after the electronic apparatus is turned off, the display screen is in a display disabled state; and the second display mode is that after the electronic apparatus is turned on, the display screen is always in a display state. The (Continued)

apparatus may save electric energy of the electronic apparatus. A controlling method for the electronic apparatus is further provided.

18 Claims, 5 Drawing Sheets

(51) Int. Cl.
*H04M 19/04* (2006.01)
*H04M 1/725* (2006.01)
*G06F 1/16* (2006.01)
*G06F 3/14* (2006.01)
*H04W 52/02* (2009.01)
*G06K 9/00* (2006.01)

(52) U.S. Cl.
CPC ...... *G06F 3/1423* (2013.01); *H04M 1/72522* (2013.01); *H04M 19/04* (2013.01); *H04W 52/027* (2013.01); *G06K 9/00006* (2013.01); *G09G 2330/022* (2013.01); *G09G 2358/00* (2013.01); *G09G 2360/04* (2013.01); *H04M 2250/16* (2013.01)

(58) Field of Classification Search
USPC ...................... 1/1; 324/427; 345/158; 726/16
See application file for complete search history.

(56) References Cited

U.S. PATENT DOCUMENTS

| | | | | |
|---|---|---|---|---|
| 2010/0017872 | A1* | 1/2010 | Goertz | G06F 3/0481 |
| | | | | 726/16 |
| 2014/0204027 | A1* | 7/2014 | Walline | G06F 1/1626 |
| | | | | 345/158 |
| 2015/0002160 | A1* | 1/2015 | Lee | G06F 1/26 |
| | | | | 324/427 |
| 2017/0068418 | A1* | 3/2017 | Tanaka | G06F 3/0488 |
| 2017/0357433 | A1* | 12/2017 | Boule | G06F 3/04817 |

FOREIGN PATENT DOCUMENTS

| | | |
|---|---|---|
| CN | 102346658 A | 2/2012 |
| CN | 104598186 A | 5/2015 |
| CN | 104796553 A | 7/2015 |
| CN | 104967704 A | 10/2015 |
| CN | 105049564 A | 11/2015 |
| CN | 105259990 A | 1/2016 |
| CN | 105282315 A | 1/2016 |
| CN | 105472068 A | 4/2016 |
| CN | 105872135 A | 8/2016 |
| CN | 105872265 A | 8/2016 |
| CN | 106354465 A | 1/2017 |
| CN | 206164627 U | 5/2017 |

* cited by examiner

500

```
┌─────────────────────────────────────────────────────────┐
│ the primary display screen is configured to display in  │
│ the first display mode; wherein the first display mode  │
│ is that after the electronic apparatus is turned on, in │── S501
│ the non-standby state, the display screen is in the     │
│ display-enabled state, and in the standby state, or     │
│ after the electronic apparatus is turned off, the       │
│ display screen is in the display-disabled state         │
└─────────────────────────────────────────────────────────┘
                            │
                            ▼
┌─────────────────────────────────────────────────────────┐
│ the secondary display screen is configured to display   │
│ in the second display mode; wherein the second display  │── S502
│ mode is that the secondary display screen is always in  │
│ the display state after the electronic apparatus is     │
│ powered on                                              │
└─────────────────────────────────────────────────────────┘
```

Fig.5

ELECTRONIC APPARATUS AND CONTROLLING METHOD THEREOF

TECHNICAL FIELD

Embodiments of the present disclosure relate to an electronic apparatus and a method for controlling the electronic apparatus.

BACKGROUND

With the development of smart phones, the size of a cell phone screen is increasingly larger and larger, the resolution is also higher and higher, and the power consumption of the screen is therefore higher and higher. However, most users illuminate the screen only for the purpose of simple functions such as time, and the whole process wastes both time and energy and frequently pressing keys will also influence the life of keys. Samsung, LG Display and Nokia have developed a "Always On" function, that is, the screen is kept always displaying with a very low luminance. However, this approach still requires that the entire screen is illuminated, though with low luminance. After the screen size increases, the power consumption will also increase, in particular for an AMOLED screen, long time illumination will likely cause significant impact on the screen life.

SUMMARY

The objects of embodiments of the present disclosure are to provide an electronic apparatus and a controlling method applied to the electronic apparatus to address the above-mentioned technical problems.

According to at least one embodiment of this disclosure, an electronic apparatus is provided, comprising: a primary display screen and a secondary display screen, wherein, the primary display screen and the secondary display screen are located in different areas of the electronic apparatus respectively; the primary display screen is configured to display in a first display mode; the secondary display screen is configured to display in a second display mode; the first display mode is that after the electronic apparatus is turned on, in a non-standby state, the display screen is in the display-enabled state, and in a standby state, or after the electronic apparatus is turned off, the display screen is in a display-disabled state; and the second display mode is that after the electronic apparatus is turned on, the display screen is always in a display state.

For example, the primary display screen is disposed in a middle region of a top surface of the electronic apparatus; and the secondary display screen is disposed in a perimeter region surrounding the middle region of the top surface of the electronic apparatus.

For example, the primary display screen and the secondary display screen are located on a same surface of the electronic apparatus.

For example, the secondary display screen has a display area with an area smaller than that of the primary display screen.

For example, the secondary display screen is disposed on a homepage key of the electronic apparatus.

For example, the secondary display screen matches the homepage key in shape.

For example, the second display mode further comprises being in the display enabled state when the electronic apparatus is in a powered off state.

For example, further comprising a battery; wherein the battery powers the secondary display screen when the electronic apparatus is in the powered off state.

For example, the secondary display screen displays current time information in the second display mode.

For example, further comprising a processor; wherein the secondary display screen is connected with the processor and displays relevant information of system programs or application programs in the electronic apparatus in the second display mode.

For example, the relevant information comprises prompting information or notification information.

For example, the secondary display screen displays the current time information while receiving no instruction from the processor; and the secondary display screen displays the relevant information in place of the current time information displayed before after receiving a instruction from the processor.

For example, the secondary display screen comprises at least one of liquid crystal display, active matrix organic light emitting diode screen or electronic ink screen.

For example, the secondary display screen is a touch screen.

For example, the secondary display screen has a finger-print identification function.

According to at least one embodiment of this disclosure, a method for controlling an electronic apparatus is provided, the electronic apparatus comprising: a primary display screen and a secondary display screen located in different areas of the electronic apparatus respectively; the method comprises: the primary display screen displays in a first display mode, wherein the first display mode is that after the electronic apparatus is turned on, in a non-standby state, the display screen is in the display-enabled state, and in a standby state, or after the electronic apparatus is turned off, the display screen is in a display-disabled state; and the secondary display screen displays in a second display mode; wherein the second display mode is that the secondary display screen is always in a display state after the electronic apparatus is powered on.

For example, the second display mode further comprises being in the display enabled state when the electronic apparatus is in a powered off state.

For example, the secondary display screen displays current time information in the second display mode.

For example, the secondary display screen displays relevant information of system programs or application programs in the electronic apparatus in the second display mode.

For example, the secondary display is configured to display current time information while no instruction is received from the processor and display the relevant information in place of the current time information displayed before after receiving an instruction from the processor.

BRIEF DESCRIPTION OF DRAWINGS

In order to describe the technical proposal of embodiments of the present disclosure more clearly, accompanying drawings that would be used in describing embodiments will be briefly introduced below. Accompanying drawings in the following description are only example embodiments of the present disclosure.

FIG. 5 shows a flow chart of a controlling method of an electronic apparatus according to an embodiment of the present disclosure.

DETAILED DESCRIPTION

Figure 1:
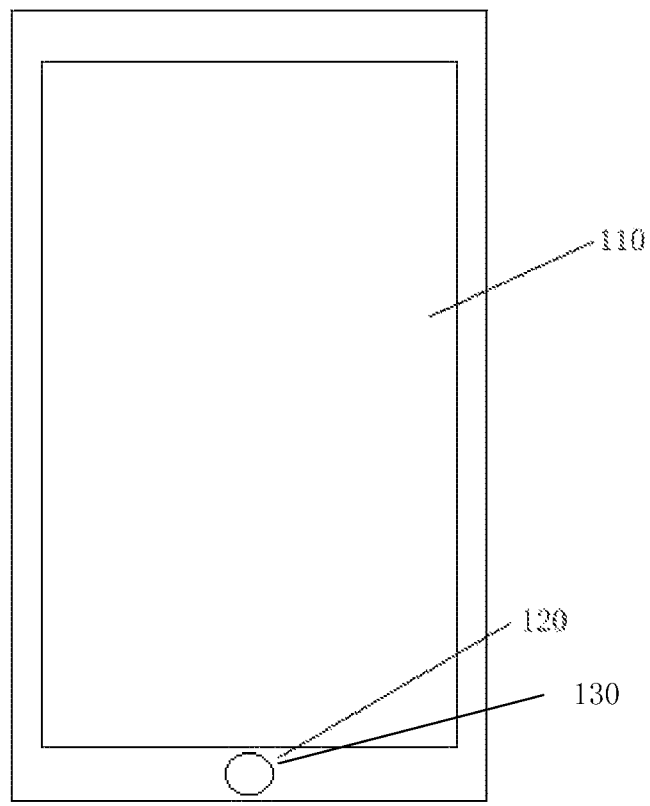
FIG. 1 shows a structure diagram of an electronic apparatus according to an embodiment of the present disclosure.

Hereinafter, preferred embodiments of the present disclosure will be described in detail with reference to accompanying drawings. It is noted that in the present specification and accompanying drawings, substantially identical steps and elements are denoted by the same reference numerals and repeated explanations thereof will be omitted.

In the following embodiments of the present disclosure, an electronic apparatus refers to an apparatus that can communicate with other apparatuses. Specific forms of the electronic apparatus include, but not limited to a mobile telephone, a tablet, a digital camera, a personal digital assistant, a portable computer and a game machine etc. Embodiments of the present disclosure are described only with respect to a mobile telephone as an example.

FIG. 1 shows a structure diagram of an electronic apparatus according to an embodiment of the present disclosure. Referring to FIG. 1, the electronic apparatus 100 includes a primary display screen 110 and a secondary display screen 120. According to one example of the present disclosure, the secondary display screen has an area smaller than that of the primary display screen. Alternatively, the volume occupied by the secondary display screen in the electronic apparatus is smaller than that occupied by the primary display screen. According to one example of the present disclosure, the primary display screen 110 and the secondary display screen 120 are located in different regions of the electronic apparatus respectively. For example, the primary display screen 110 and the secondary display screen 120 may be located on the same surface of the electronic apparatus. For example, the primary display screen 110 is located at upper part of the front side (or top surface) of the electronic apparatus, and the secondary display screen 120 is located at lower part of the front side of the electronic apparatus. Alternatively, the primary display screen 110 is located at lower part of the front side of the electronic apparatus, and the secondary display screen 120 is located at upper part of the electronic apparatus. That is, when the primary display screen 110 and the secondary display screen 120 are located on the same surface of the electronic apparatus, the secondary display screen 120 may be located above the primary display screen 110, or under the primary display screen 110, or to the left or right of the primary display screen. Alternatively, as another example, the primary display screen 110 may be disposed in the middle region of the top surface of the electronic apparatus; and the secondary display screen 120 is disposed in perimeter region surrounding the middle region of the top surface of the electronic apparatus. The position of the secondary display screen 120 may be set according to the user's use habit such that the user can easily view the information on the secondary display screen when taking the electronic apparatus.

Of course, the primary display screen 110 and the secondary display screen 120 may also be located on different surfaces of the electronic apparatus. For example, the primary display screen 110 is located on the front surface of the electronic apparatus while the secondary display screen 120 is located on the side surface or back surface of the electronic apparatus, which is not specifically limited in the present disclosure and may be set by those skilled in the art as required.

Additionally, there may also be a plurality of secondary display screens located on one and the same or different surfaces of the electronic apparatus respectively and different secondary display screens may display the same content or different contents.

Referring to FIG. 1, the area of the display area of the secondary display screen 120 is smaller than that of the primary display screen 110. For example, the secondary display screen 120 is disposed on the homepage key 130 of the electronic apparatus or matches the homepage key 130 in shape. According to one example of the present disclosure, "match" means that the secondary display screen 120 has a shape identical with or similar to that of the homepage key 130 or can cover but not influence the use of the homepage key 130. For example, when the homepage key is circular, the secondary display screen 120 is also set to be circular, and when the homepage key is a square, the secondary display screen 120 is also set to a square. When the secondary display screen 120 is disposed on the homepage key or matches the homepage key in shape, the area of the display area of the secondary display screen 120 may be much smaller than that of the primary display screen 110. In this way, on the one hand it is possible to save electric power amount for illuminating the secondary display screen 120, and on the other hand no more space on the electronic apparatus will be occupied.

In an embodiment of the present disclosure, the primary display screen 110 is configured to display in the first display mode and the secondary display screen is configured to display in the second display mode. The first display mode is for example, that after the electronic apparatus is turned on, in the non-standby state, the display screen is in the display-enabled state, and in the standby state, or after the electronic apparatus is turned off, the display screen is in the display-disabled state. The second display mode is for example, that after the electronic apparatus is turned on, the display screen is always in the ON state. That is, the primary display screen 110 is the display mode for the display screen of the electronic apparatus. That is, in the normal use state after powered on, the display screen is in the ON state, the backlight is illuminated, and the user can view the displayed contents on the display screen. While in the standby state or OFF state, the display screen is in OFF state, the backlight is turned off, and the user can not view the displayed contents on the display screen. The secondary display screen 120 is always in ON state while being powered on, and the user can view the displayed contents on the secondary display screen 120 at any time. Since the secondary display screen has a small display area and low requirements for image fineness degree and colors, even in ON state for long term, as compared to turning on the primary display screen to view user's common information such as the current time information, it can still save energy and power consumption due to its low electric energy consumption. Also, since the secondary display screen is in a normally lit state, this facilitates the user to view contents displayed thereon at any time.

In addition, according to one example of the present disclosure, the second display mode may be further configured to be also in display-enabled state while the electronic apparatus is in OFF state. That is, the secondary display screen 120 that works in the second display mode may also be in ON state while the electronic apparatus is powered off, which facilitates the user to view information at night or power exhaustion for the cell phone. For example, the electronic apparatus may include a battery that powers the secondary display screen 120 when the electronic apparatus is powered off to guarantee it's in ON state for long term.

According to one example of the present disclosure, the secondary display screen may be a touch screen. The user may also touch the secondary display screen to implement input control operations on the electronic apparatus. The secondary display screen may for example receive touch operations such as clicking, pressing and sliding, and may also combine touch operations on the primary display screen 110 to control input operations of the electronic apparatus.

According to one example of the present disclosure, the secondary display screen may have fingerprint identification function that allows the user to authenticate identity by gathering fingerprint information via the secondary display screen while the user turns on the apparatus or in other cases that need identity authentication.

Furthermore, the secondary display screen may be of various types such as at least one of liquid crystal display, active matrix organic light emitting diode screen (AMOLED) or electronic ink screen.

In an embodiment of the present disclosure, by providing a secondary display screen in the electronic apparatus, it is possible to avoid energy wasting caused by viewing common information such as time with the primary display screen and also facilitate the user's usage. It is therefore possible to keep the secondary display screen in normally lit state for long time with extremely low energy and simplify the steps of functions such as viewing time and notifications due to its small display area, low requirements on image fineness degree and color.

Figure 2:
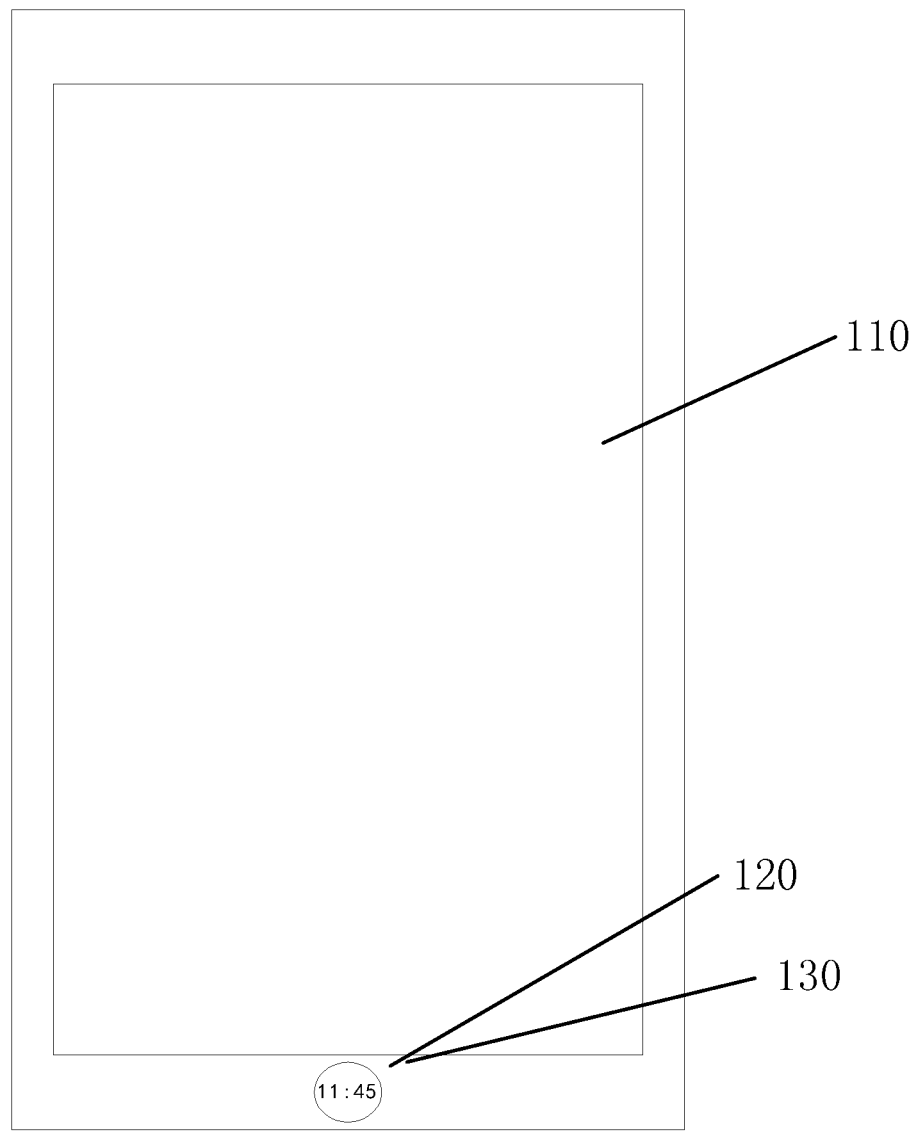
FIG. 2 shows a schematic diagram of a first application example of an electronic apparatus according to an embodiment of the present disclosure.
Figure 3:
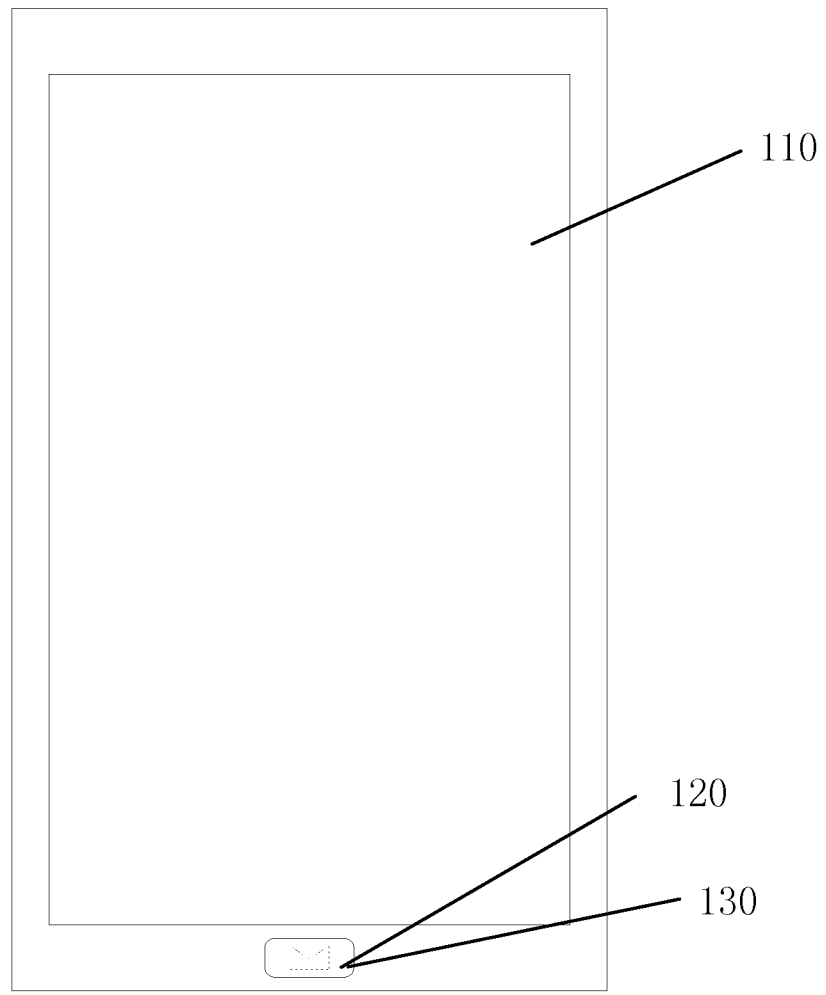
FIG. 3 shows a schematic diagram of a second application example of an electronic apparatus according to an embodiment of the present disclosure.
Figure 4:
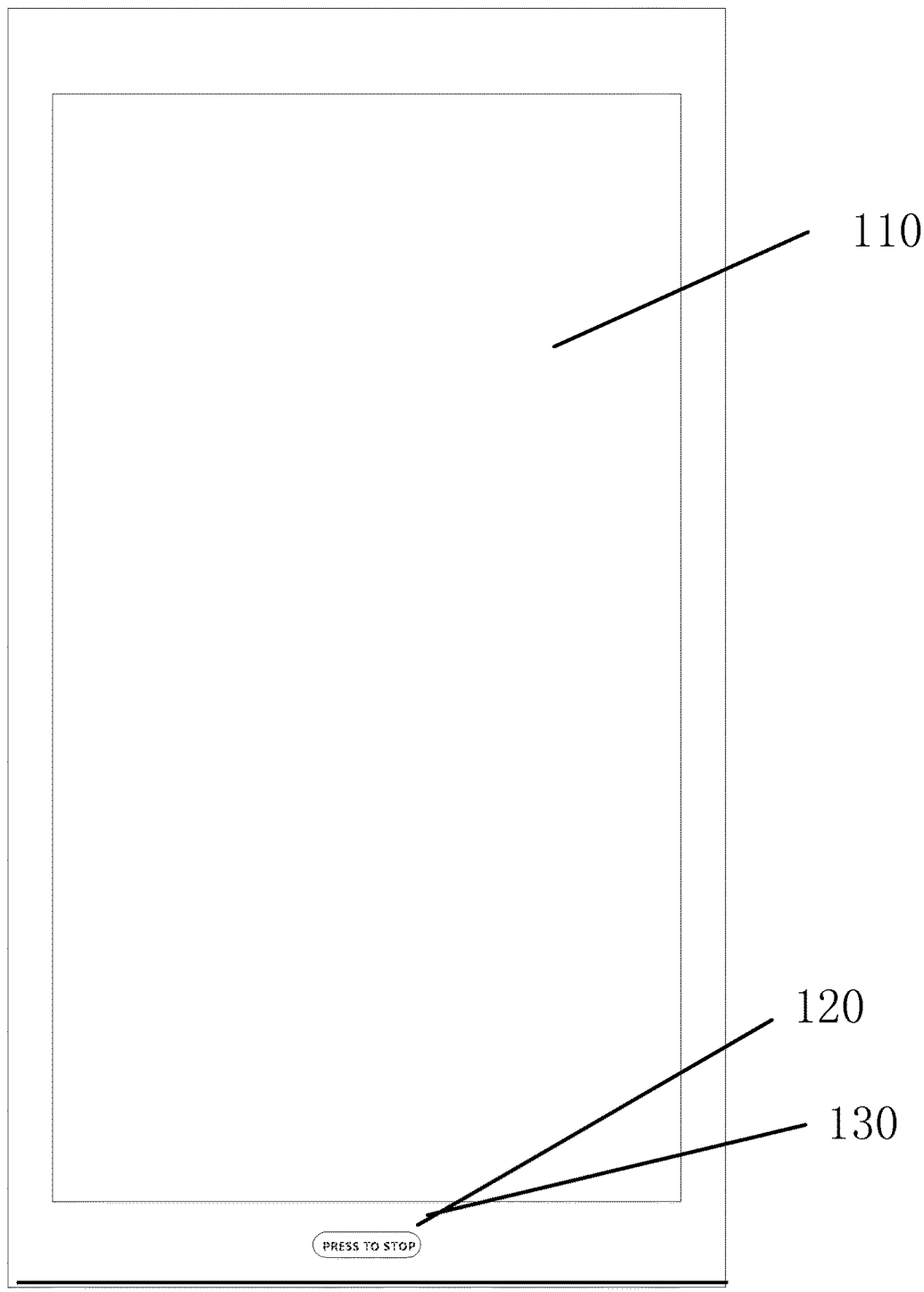
FIG. 4 shows a schematic diagram of a third application example of an electronic apparatus according to an embodiment of the present disclosure.

FIG. 2 shows a schematic diagram of a first application example of an electronic apparatus according to an embodiment of the present disclosure. Referring to FIG. 2, the secondary display screen 120 displays the current time information in the second display mode. FIG. 3 shows a schematic diagram of a second application example of an electronic apparatus according to an embodiment of the present disclosure. Referring to FIG. 3, the secondary display screen 120 displays mail notification messages in the second display mode. FIG. 4 shows a schematic diagram of a third application example of an electronic apparatus according to an embodiment of the present disclosure. Referring to FIG. 4, the secondary display screen 120 displays the exit button of an application program in the second display mode. When the user touches the secondary display screen 120, the current application program will exit.

According to one example of the present disclosure, the electronic apparatus further includes a processor that may be the main processor in the electronic apparatus such as CPU or a special purpose processor chip. According to one example of the present disclosure, there may be one or more processors. One processor may be connected with two display screens at the same time, or one processor is connected with only one display screen or a plurality of processors are connected with one display screen. For example, the secondary display screen 120 is connected with the processor and displays relevant information of system programs or application programs such as prompting messages or notification messages in the electronic apparatus in the second display mode. The secondary display screen 120 may display information corresponding to the currently running application programs according to properties of the current application programs. The information displayed on the secondary display screen 120 may be set by the user, and priorities may also be set for displaying notification messages of the application programs or system programs.

For example, when no instruction is received from the processor, the secondary display screen 120 displays the default current time information; and when a new mail is received in the mail application, the processor may send an instruction to the secondary display screen 120 to display a mail icon for replacing the prior event information, so that the user is informed to view the new mail. After the user has viewed the new mail, the icon for new mail is no longer displayed on the secondary display screen 120, the default information such as the current time information is displayed instead.

As another example, if the current application program is a video playing program, the secondary display screen 120 may display information related to the video playing program. For example, pausing video, closing video, volume control or progress control etc. FIG. 4 shows the display of the application program pausing icon (press to stop) with which the user may touch the secondary display screen 120 to pause the current application program.

In addition, in an embodiment of the present disclosure, the secondary display screen 120 is disposed at the location of homepage key. When the secondary display screen 120 has the touch function, the touch function may be separated from the function area of the homepage key. For example, the user may implement the touch function of the secondary display screen 120 by implementing touch and sliding up and down and left and right operation on the secondary display screen 120. While when the user presses down the key, the homepage key function is implemented.

Optionally, when the secondary display screen 120 has the touch function, the touch function may also be integrated with the function of the homepage key. That is, the homepage key is implemented as a key with both display and touch functions. While not receiving touch operation, the homepage key displays information such as the current time or system notifications and application program notifications. While receiving touch operations is required, the homepage key may receive operations such as touches that slide up and down, left and right, and tap, double taps, and press to execute different input commands.

In an embodiment of the present disclosure, it is possible to facilitate the user to view messages quickly by displaying notifications of application programs or system programs on the secondary display screen disposed on the homepage key, without occupying extra space of the electronic apparatus, which guarantees the esthetic appearance of the electronic apparatus while increasing its utility at the same time.

FIG. 5 shows a flow chart of a controlling method of an electronic apparatus according to an embodiment of the present disclosure. The controlling approach is the controlling method for the electronic apparatus in the aforementioned embodiments and therefore corresponds to the structure and function of the electronic apparatus. For brevity of the description, a brief introduction is presented below.

The electronic apparatus corresponding to the controlling method includes: a primary display screen and a secondary display screen located in different areas of the electronic apparatus respectively.

Referring to FIG. 5, the controlling method 500 of the electronic apparatus may include the following steps.

In step S501, the primary display screen is configured to display in the first display mode; wherein the first display mode is that after the electronic apparatus is turned on, in the non-standby state, the display screen is in the display-enabled state, and in the standby state, or after the electronic apparatus is turned off, the display screen is in the display-disabled state.

In step S502, the secondary display screen is configured to display in the second display mode; wherein the second display mode is that the secondary display screen is always in the display state after the electronic apparatus is powered on.

According to one example of the present disclosure, the second display mode is further in the display enabled state in the powered off state of the electronic apparatus.

According to one example of the present disclosure, the secondary display screen is configured to display the current time information in the second display mode.

According to one example of the present disclosure, the electronic apparatus further includes a processor with which the secondary display screen is connected. The controlling method further includes configuring the secondary display screen to display relevant information of system programs or application programs in the electronic apparatus in the second display mode according to the instruction of the processor.

According to one example of the present disclosure, the relevant information includes prompting information or notification information.

According to one example of the present disclosure, the secondary display is configured to display the current time information while no instruction is received from the processor and display the relevant information in place of the displayed current time information after receiving instruction from the processor.

Embodiments of the present disclosure allow the secondary display screen of an electronic apparatus to display some user's common information or notification information of application programs, system programs for long term by controlling the electronic apparatus and save the electric energy of the electronic apparatus due to the small screen of the secondary display screen and facilitate the user to view information.

The skilled in the art may realize that, the units and arithmetic process in each example described with the embodiments disclosed in this disclosure can be achieved through electronic hardware, computer software or the combination of the both. Also, the software module may be set in any kinds of computer mediums. In order to describe clearly the interchangeability of hardware and software, the constitution and steps of each example have been described generally in terms of function in the description above. These functions are implemented with hardware or software is due to the specific application and design restriction condition of the technical solution. The skilled in the art may use different method to achieve the described function pointing to each specific application, however, the achievement should not be considered over the scope of this disclosure.

Those skilled in the art should appreciate that various modifications, combinations, sub-combinations and substitutions may be done depending on design requirements and other factors as long as they fall within the scope of the accompanying claims and their equivalents.

The present application claims priority of China Patent application No. 201611028802.9 filed on Nov. 18, 2016, the content of which is incorporated in its entirety as part of the present application by reference herein.

The invention claimed is:

1. A method for controlling an electronic apparatus, the electronic apparatus comprising: a primary display screen and a secondary display screen located in different areas of the electronic apparatus respectively;

the method comprises:

the primary display screen displays in a first display mode, wherein the first display mode is that after the electronic apparatus is turned on, in a non-standby state, the primary display screen is in a display-enabled state, and in a standby state, or after the electronic apparatus is turned off, the primary display screen is in a display-disabled state; and the secondary display screen displays in a second display mode; wherein the second display mode is that the secondary display screen is always in a display state after the electronic apparatus is powered on;

wherein the non-standby state is a state in which the electronic apparatus is turned on and the primary display screen displays for operation, the standby state is a state in which the electronic apparatus is turned on and the primary display screen doesn't display for operation, the display-enabled state is a state in which the primary display screen displays, and the display-disabled state is a state in which the primary display screen doesn't display;

the second display mode further comprises being in the display-enabled state when the electronic apparatus is in a powered off state, such that the secondary display screen is not dark; and the powered off state is a state in which the electronic apparatus is turned off.

2. The controlling method of claim 1, wherein the secondary display screen displays current time information in the second display mode.

3. The controlling method of claim 1, wherein the secondary display screen displays relevant information of system programs or application programs in the electronic apparatus in the second display mode.

4. The controlling method of claim 3, wherein the secondary display is configured to display current time information while no instruction is received from a processor and display the relevant information in place of the current time information displayed before after receiving an instruction from the processor.

5. An electronic apparatus comprising: a primary display screen and a secondary display screen, wherein the primary display screen and the secondary display screen are located in different areas of the electronic apparatus respectively;

the primary display screen is configured to display in a first display mode;

the secondary display screen is configured to display in a second display mode;

the first display mode is that after the electronic apparatus is turned on, in a non-standby state, the primary display screen is in a display-enabled state, and in a standby state, or after the electronic apparatus is turned off, the primary display screen is in a display-disabled state; and the second display mode is that after the electronic apparatus is turned on the secondary display screen is always in a display state;

wherein the non-standby state is a state in which the electronic apparatus is turned on and the primary display screen displays for operation, the standby state is a state in which the electronic apparatus is turned on and the primary display screen doesn't display for operation, the display-enabled state is a state in which the primary display screen displays, and the display-disabled state is a state in which the primary display screen doesn't display;

the second display mode further comprises being in the display-enabled state when the electronic apparatus is in a powered off state, such that the secondary display screen is not dark; and the powered off state is a state in which the electronic apparatus is turned off.

6. The electronic apparatus of claim 5, wherein the primary display screen is disposed in a middle region of a top surface of the electronic apparatus; and the secondary display screen is disposed in a perimeter region surrounding the middle region of the top surface of the electronic apparatus.

7. The electronic apparatus of claim 6, wherein the primary display screen and the secondary display screen are located on a same surface of the electronic apparatus.

8. The electronic apparatus of claim 5, wherein the secondary display screen has a display area with an area smaller than that of the primary display screen.

9. The electronic apparatus of claim 8, wherein the secondary display screen is disposed on a homepage key of the electronic apparatus.

10. The electronic apparatus of claim 9, wherein the secondary display screen matches the homepage key in shape.

11. The electronic apparatus of claim 5, further comprising a battery;

wherein the battery powers the secondary display screen when the electronic apparatus is in the powered off state.

12. The electronic apparatus of claim 5, wherein the secondary display screen displays current time information in the second display mode.

13. The electronic apparatus of claim 5, further comprising a processor;

wherein the secondary display screen is connected with the processor and displays relevant information of system programs or application programs in the electronic apparatus in the second display mode.

14. The electronic apparatus of claim 13, wherein the relevant information comprises prompting information or notification information.

15. The electronic apparatus of claim 13, wherein the secondary display screen displays current time information while receiving no instruction from the processor; and the secondary display screen displays the relevant information in place of the current time information displayed before after receiving an instruction from the processor.

16. The electronic apparatus of claim 5, wherein the secondary display screen comprises at least one of liquid crystal display, active matrix organic light emitting diode screen or electronic ink screen.

17. The electronic apparatus of claim 5, wherein the secondary display screen is a touch screen.

18. The electronic apparatus of claim 17, wherein the secondary display screen has a fingerprint identification function.

* * * * *